Patented Feb. 15, 1949

2,461,510

UNITED STATES PATENT OFFICE 2,461,510

COMPOSITIONS OF MATTER AND METHODS AND STEPS OF MAKING AND USING THE SAME

Mortimer T. Harvey, South Orange, N. J., assignor to Harvel Research Corporation, a corporation of New Jersey No Drawing. Application October 30, 1947, Serial No. 783,230

9 Claims. (Cl. 260—64)

This invention relates to methods for producing novel compositions of matter and to said novel compositions themselves, as well as to novel products produced with said novel compositions of matter. More particularly this invention re'ates to novel methods for treating organic reaction products obtained by reacting under alkaline conditions furfuraldehyde and one or more ketones and to the novel products produced thereby. The ketones employed in the provision of said starting materials, namely said reaction products, are those having at least two hydrogen atoms on an alpha carbon. Examples of said ketones are acetone, methyl ethyl ketone, methyl isobutyl ketone, diacetone alcohol, isophorone, cyc'ohexanone, phorone, mesityl oxide, acetophenone, methyl n-amyl ketone, acetonyl acetone (hexandione 2,5), diethyl ketone and di-isobutyl ketone. This application is a continuation in part of my application Serial No. 484,230, filed April 23, 1943, and since abandoned.

The starting materials may be produced in an easy and simple manner. They may be produced either with or without the application of external heat. Generally in commercial production these starting materials are produced by adding an alkaline material to a mixture of furfuraldehyde and one or more of said ketones. Usual'y furfuraldehyde and a ketone or a mixture of ketones are mixed with each other and then there is added thereto a quantity of an alkaline material such as an aqueous solution of sodium hydroxide, potassium hydroxide, lime or the like. These components are mixed with each other in an autoclave or closed unit and shortly after the mixture takes place, an exothermic reaction occurs and sometimes the pressure within the autoclave will rise to a considerable degree. The reaction may be so vigorous as not to be easily controlled by ordinary methods such as by using reacting units which have air vents through the top because through such conditions many times there may be losses of some of the reaction products escaping through the air vents. For this reason an autoclave is recommended as the reacting unit. However, by choosing the reactants, by controlling the quantity of reactants, and the quantity of the alkaline material, it is possible to provide conditions such that no autoclave is required and some external heat will be desirable in order to obtain the reaction products in a relatively short period of time. Generally, however, the quantity of reactants as well as the quantity of alka'ine material may be so chosen that a violent exothermic reaction will take place, all this being known to the art. After the exothermic reaction has subsided the reaction is practically complete. Then the entire mass may be externally heated to polymerize under alkaline conditions the compounds produced by the reaction. By this procedure there may be produced reaction masses of viscosities in the range of 50–5000 cp. at 25° C. which are to be used as the starting materials herein and consist chiefly of (1) a thermoplastic resin which is the alkali polymerization product of difurfural-ketone resin and (2) di-furfural ketone having the following formula:

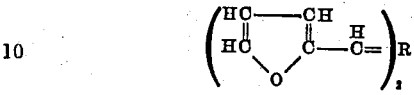

in which R is a ketone lacking two of the hydrogen atoms normally on either one or both of its alpha carbons with the quantity of said resin being 5%–50% by weight of the reaction mass. The difurfural ketone is produced as a result of reaction between the furfuraldehyde and ketone wherein two hydrogens on the alpha carbons unite with the oxygen of the aldehyde group of the furfuraldehyde to split off water.

In the production of the various starting materials of this invention, I prefer that the mole ratio of the furfuraldehyde to the ketones employed be in the range of 1-1 to 2-1 although this ratio may be as high as 8-1 depending on the ketone emp'oyed.

According to this invention, these various reaction products whose viscosities are 50–5000 centipoises at 25° C. may be converted to thermosetting heat reactive resins which are commercially practical compositions. By following the teachings of this invention said novel products may be produced in a commercially practical factory-feasible manner where control is a very important factor. These purposes are accomplished by adding an acidic agent to the starting material to lower the pH thereof to a value of 0.35-3 and preferably in the range 0.5-1.5 and under such pH conditions, the starting material is externally heated to maintain the temperature of the mass in the range of 180° F.-260° F. and preferab'y 210° F.-250° F. under atmospheric, subatmospheric or superatmospheric pressure conditions. The acidic agent preferably employed is an alkyl sulphate such as diethyl sulphate, or an aqueous solution of an acidic agent such as a mineral acid, examples of which are phosphoric acid, hydrochloric acid, sulphuric acid, di- or tri-chloraectic acid, or an aqueous solution of an acid salt capable of providing said pH of 0.5-1.5. The external heat may be supplied in any of various manners, such as direct fire, steam coil, electrical high frequency, etc. Said mass is maintained in said temperature range until a sample thereof when heated for 12-16 hours at 225° F. is converted to the substantially infusible state. By following this procedure, it is possible to obtain factory production batches of thermosetting heat reactive resins of any desired viscosity which may be drawn from the polymerizing vessel. By following this procedure the starting material is polymerized to the thermosetting heat reactive state. This polymerizing proceeds without reaction with other compounds because no reactant is added to the reaction mass. Consequently, this polymerization of the reaction mass may be referred to herein as homopolymerization.

These novel thermosetting heat reactive resins are exceptionally stable and if desired may be further stabilized by increasing the pH thereof to a value of 3-9 by the addition of appropriate alkaline materials, such as sodium hydroxide, potassium hydroxide, lime or the like. These novel resins may be heat converted to the infusible state while under acid, neutral or alkaline conditions. They may be reacted under acidic or alkaline conditions with a reactive methylene group containing agent to provide other thermosetting resins. Examples of said reactive methylene group containing agents are formaldehyde, glyoxal, paraldehyde, acetaldehyde, hexamethylene tetramine, etc., as well as their polymers. When hexamethylene tetramine is employed, no catalyst need be used. When reacted with formaldehyde I prefer that the ratio by weight of the resin to the formaldehyde be in the range of 100-2 to 100-15. Where any other reactive methylene group containing agent is used, a quantity is employed which is the molecular equivalent of the formaldehyde in said ratio range.

The following Examples 1 to 18 inclusive are specific illustrations of the methods as well as some of the products embodying the invention, all parts being given by weight unless otherwise specified.

*Example 1*

Since the production of some of these reaction products of furfuraldehyde and ketone under alkaline conditions are extremely violent, the following method is recommended in handling this reaction.

| | Parts by weight |
|---|---|
| Furfuraldehyde | 96 |
| Acetone | 58 |
| 10% sodium hydroxide aqueous solution | 10 | are mixed together rapidly and put into an autoclave which will stand pressure up to 100 to 150 lbs. per square inch. The reaction is rapid. Usually about 3 minutes after the addition of the alkali, an extremely exothermic condition occurs and the pressure in the autoclave will rise to from 25 lbs. upwards. After the heat of the exothermic reaction has subsided, the reaction is practically complete, although a further heating to maintain the contents in the state of boiling for one hour is recommended. The mass may then be cooled to about room temperature and there is added thereto 6.5 parts by weight of a 50% by weight sulfuric acid water mixture. This mass, which is now on the acid side and has a pH of less than 3, is heated with stirring in an open kettle of the proper metal which would not be affected by the acid conditions, such as Monel metal, copper or stainless steel. The heating is continued up to an elevated temperature in the vicinity of 220° F. until the viscosity has reached the desired consistency and the mass is a thermosetting resin. This is then cooled rapidly and may be stored for use as mentioned above. The resultant product is an intermediate or fusible thermosetting resin, soluble in acetone, insoluble in water, cures to an infusible state upon maintaining about 100 grams thereof for 12-16 hours at 100° C. either on the acid or alkaline side, reacts with paraformaldehyde and hexamethylene tetramine and has a specific gravity greater than 1.10.

*Example 2*

The same procedure is followed as set forth in Example 1 except that the furfuraldehyde has been doubled in quantity so that the reaction represents two moles of furfuraldehyde to one mole of ketone. 192 parts by weight of furfuraldehyde, 58 parts by weight of acetone and 10 parts by weight of a 10% aqueous solution of sodium hydroxide were used. The conditions and methods of handling were exactly the same as in Example 1. The finished product is an intermediate or fusible thermosetting resin, soluble in acetone, insoluble in water, cures to an infusible state when about 100 grams thereof is maintained for 12 to 16 hours at 100° C. either on the acid or alkaline side, reacts with paraformaldehyde and hexamethylene tetramine and has a specific gravity greater than 1.10.

*Example 3*

| | Grams |
|---|---|
| Furfuraldehyde | 100 |
| Methyl isobutyl ketone | 100 |
| and a solution of | |
| Sodium hydroxide in 2 grams of water | 1 | were mixed together and a slight exothermic reaction took place. The mixture was heated to boiling and maintained in this state of boiling for about 3 hours under a reflux condenser after which the batch was neutralized with hydrochloric acid. After neutralization, 8 grams of a 50% by weight sulfuric acid-water mixture was added and the whole mass was heated with stirring at a temperature of approximately 200° F. until a sample thereof is a thermosetting resin. Then the resultant mass was cooled rapidly to room temperature and the resultant product was a thermosetting fusible resin soluble in acetone, insoluble in water which cures to an infusible state upon maintaining 100 grams thereof at 100° C. for 12 to 16 hours either on the acid or alkaline side, reacts with paraformaldehyde and hexamethylene tetramine and has a specific gravity greater than 1.0.

*Example 4*

| | Grams |
|---|---|
| Furfuraldehyde | 200 |
| Diacetone alcohol (4 - hydroxy - 2 - keto - 4 methyl pentane) | 232 |
| and a solution of | |
| Sodium hydroxide in 1 gram of water | 1 | were mixed together and heated to boiling and maintained in the state of boiling for about one hour. At the beginning, the reaction was strongly exothermic. The reaction mixture was then neutralized with dilute sulfuric acid. After neutralization, 16 grams of a 50% by weight sulfuric acid-water mixture was added and the whole mass rapidly heated with constant stirring to approximately 260° F. Then it was rapidly cooled to room temperature and the resultant product is an intermediate or fusible thermosetting resin, soluble in acetone, insoluble in water, cures to an infusible state when about 100 grams thereof is maintained for 12 to 16 hours at 100° C. either on the acid or alkaline side, reacts with paraformaldehyde and hexamethylene tetramine and has a specific gravity greater than 1.10.

Example 5

| | Grams |
|---|---|
| Furfuraldehyde | 100 |
| Isophorone | 138 |
| and a solution of | |
| Sodium hydroxide in 10 grams of water | 5 | were mixed together and placed under a reflux condenser. The mixture became hot on standing a few minutes. The mixture was then heated to boiling and maintained in this state of boiling under a reflux condenser for about one hour. Then it was neutralized with hydrochloric acid. After neutralization, 8 grams of a 50% by weight sulfuric acid-water mixture was added, the whole mass was rapidly heated with stirring to approximately 255° F. Immediately after reaching this temperature, the mass was rapidly cooled to room temperature and the resultant product was an intermediate or fusible thermosetting resin, soluble in acetone, insoluble in water, cures to an infusible state upon heating about 100 grams thereof for 12 to 16 hours at 100° C. either on the acid or alkaline side, reacts with paraformaldehyde and hexamethylene tetramine and has a specific gravity greater than 1.0.

Example 6

| | Grams |
|---|---|
| Furfuraldehyle | 96 |
| Cyclohexanone | 98 |
| and a solution of | |
| Sodium hydroxide in 2 grams of water | 1 | were mixed together and placed under a reflux condenser. The mixture became hot and commenced boiling before heat was applied. Immediately after this boiling due to the exothermic reaction had subsided, heat was applied and the mixture was maintained in the state of boiling under said condenser for one hour. It was then neutralized with hydrochloric acid. After neutralization, 8 grams of a 50% by weight sulfuric acid-water solution was added thereto and the whole mass was heated rapidly to approximately 260° F. with constant stirring and when this temperature was reached, it was immediately cooled rapidly to room temperature. The resultant product was an intermediate or fusible thermosetting resin soluble in acetone, insoluble in water, cures to an infusible state upon maintaining 100 grams thereof for 12 to 16 hours at 100° C. either on the acid or alkaline side, reacts with paraformaldehyde and hexamethylene tetramine and has a specific gravity greater than 1.10.

Example 7

| | Grams |
|---|---|
| Furfuraldehyde | 96 |
| Phorone | 138 |
| and a solution of | |
| Sodium hydroxide in 2 grams of water | 1 | were mixed together and placed under a reflux condenser. The mixture was heated to boiling and maintained in this state of boiling under said reflux condenser for about 1 hour and then neutralized with dilute sulfuric acid. After neutralization, 8 grams of a 50% by weight sulfuric-acid water mixture was added thereto and the whole mass was heated with stirring and maintained at a temperature of 230° F. until a thermosetting resin resulted. Then it was immediately cooled rapidly to room temperature and the resultant finished product is an intermediate or fusible thermosetting resin soluble in acetone, insoluble in water, cures to an infusible state upon maintaining 100 grams thereof for 12–16 hours at 100° C. either on the acid or alkaline side, reacts with paraformaldehyde and hexamethylene tetramine and has a specific gravity greater than 1.10.

Example 8

| | Grams |
|---|---|
| Furfuraldehyde | 96 |
| Mesityl oxide | 98 |
| and a solution of | |
| Sodium hydroxide in 2 grams of water | 1 | were mixed together and placed under a reflux condenser. The mixture became hot on standing. Heat was then applied and the mass boiled and maintained in this state of boiling under said reflux condenser for about 1 hour. It was then neutralized with dilute sulfuric acid. After neutralization, 8 grams of a 50% by weight sulfuric acid-water mixture was added and the whole mass was heated with stirring to approximately 260° F. Immediately upon reaching said temperature, the mass was rapidly cooled to room temperature and the resultant product was an intermediate or fusible thermosetting resin soluble in acetone, insoluble in water, cures to an infusible state upon maintaining 100 grams thereof for 12 to 16 hours at 100° C. either on the acid or alkaline side, reacts with paraformaldehyde and hexamethylene tetramine and has a specific gravity greater than 1.10.

Example 9

| | Grams |
|---|---|
| Furfuraldehyde | 96 |
| Acetophenone | 120 |
| and a solution of | |
| Sodium hydroxide in 2 grams of water | 1 | were mixed together and placed under a reflux condenser. The mixture became hot on standing at room temperature. Heat was then applied and the mass was boiled and maintained in this state of boiling under a reflux condenser for 1 hour. The mass was then neutralized with dilute sulfuric acid. After neutralization, approximately 8 grams of a 50% by weight sulfuric acid-water mixture was added and the whole mass was heated with stirring to approximately 225° C. Immediately upon reaching this temperature, the mass was cooled rapidly to room temperature. The resultant product is an intermediate or fusible thermosetting resin soluble in acetone, insoluble in water, cures to an infusible state upon maintaining 100 grams thereof for 12 to 16 hours at 100° C. either on the acid or alkaline side, reacts with paraformaldehyde and hexamethylene tetramine and has a specific gravity greater than 1.10.

Example 10

| | Grams |
|---|---|
| Furfuraldehyde | 96 |
| Methyl n-amyl ketone | 114 |
| and a solution of | |
| Sodium hydroxide in 2 grams of water | 1 | were mixed together and placed under a reflux condenser. The mixture became hot on standing at room temperature. It was further heated to boiling and maintained in this state of boiling under a reflux condenser for 1 hour. The mass was then neutralized with dilute sulfuric acid. After neutralization approximately 8 grams of a 50% by weight sulfuric acid-water mixture was added and the whole mass was heated with stirring to approximately 260° F. Immediately upon reaching said temperature, the mass was then cooled to room temperature. The resultant product was an intermediate fusible thermosetting resin soluble in acetone, insoluble in water, cures to an infusible state upon maintaining 100 grams thereof for 12 to 16 hours at 100° C. either on the acid or alkaline side, reacts with paraformaldehyde and hexamethylene tetramine and has a specific gravity greater than 1.10.

Example 11

| | Grams |
|---|---|
| Furfuraldehyde | 96 |
| Acetonylacetone (hexandione-2,5) | 114 |
| and a solution of | |
| Sodium hydroxide in 2 grams of water | 1 | were mixed together and placed under a reflux condenser. An extremely vigorous exothermic reaction set in immediately after the addition of the sodium hydroxide. After the exothermic reaction had subsided heat was applied and the mixture was kept in the state of boiling under said reflux condenser for 1 hour. An extremely viscous mass resulted and this mass was neutralized with dilute sulfuric acid. After neutralization, 4 grams of a 50% by weight sulfuric acid-water mixture was added and the whole mass was heated with stirring to approximately 260° F. Immediately upon reaching this temperature the mass was rapidly cooled to room temperature. The resultant product is an intermediate or fusible thermosetting resin, soluble in acetone, insoluble in water, cures to an infusible state upon maintaining 100 grams thereof for 12 to 16 hours at 100° C. either on the acid or alkaline side, reacts with paraformaldehyde and hexamethylene tetramine and has a specific gravity greater than 1.10.

Example 12

| | Grams |
|---|---|
| Furfuraldehyde | 96 |
| Acetonyl acetone (hexandione-2,5) | 28 |
| and a solution of | |
| Sodium hydroxide in 2 grams of water | 1 | were mixed together and placed under a reflux condenser. A vigorous exothermic reaction took place. After the exothermic reaction had subsided heat was applied and the batch was heated to boiling and maintained in this state of boiling under said reflux condenser for 1 hour. Then it was neutralized with dilute sulfuric acid. After neutralization, 5 grams of a 50% by weight sulfuric acid-water mixture was added and the whole mass was heated with stirring to approximately 260° F. Immediately upon reaching said temperature, the mass was rapidly cooled to room temperature. The resultant product was an intermediate or fusible thermosetting resin soluble in acetone, insoluble in water, cures to an infusible state upon maintaining 100 grams thereof for 12 to 16 hours at 100° C. either on the acid or alkaline side, reacts with paraformaldehyde and hexamethylene tetramine and has a specific gravity greater than 1.10.

Example 13

| | Grams |
|---|---|
| Furfuraldehyde | 96 |
| Acetonyl acetone | 14 |
| and a solution of | |
| Sodium hydroxide in 2 grams of water | 1 | were mixed together and placed under a reflux condenser. This mixture was heated to boiling and maintained in the state of boiling under said reflux condenser for 1 hour. The mass was then neutralized with dilute sulfuric acid. After neutralization, 5 grams of a 50% by weight sulfuric acid-water mixture was added and the whole mass was heated with stirring to approximately 255° F. Immediately upon reaching said temperature, the resultant mass was cooled rapidly to room temperature. The resultant product is an intermediate or fusible thermosetting resin soluble in acetone, insoluble in water, upon maintaining 100 grams thereof for 12 to 16 hours at 100° C. it cures to an infusible state either on the acid or alkaline side, reacts with paraformaldehyde and hexamethylene tetramine and has a specific gravity greater than 1.10.

Example 14

| | Grams |
|---|---|
| Furfuraldehyde | 96 |
| Diethyl ketone | 86 |
| and a solution of | |
| Sodium hydroxide in 2 grams of water | 1 | were mixed together and placed under a reflux condenser. An exothermic reaction took place in the resulting mixture upon standing about 5 minutes at room temperature. After said exothermic reaction had subsided, heat was applied to maintain said batch in the state of boiling under said reflux condenser. The reaction mass was then neutralized with dilute sulfuric acid, and after neutralization, 7½ grams of a 50% by weight sulfuric acid-water mixture was added and the whole mass was heated with stirring to approximately 255° F. Immediately upon reaching said temperature, the resultant mass was rapidly cooled to room temperature. The resultant product is an intermediate or fusible thermosetting resin soluble in acetone, insoluble in water, upon maintaining 100 grams thereof for 12 to 16 hours at 100° C. it cures to an infusible state either on the acid or alkaline side, reacts with paraformaldehyde and hexamethylene tetramine and has a specific gravity greater than 1.10.

Example 15

| | Grams |
|---|---|
| Furfuraldehyde | 96 |
| Di-isobutyl ketone | 142 |
| and a solution of | |
| Sodium hydroxide in 40 grams of water | 20 | were mixed together and placed under a reflux condenser. The mixture became hot on standing a short time at room temperature. Heat was applied and the mixture was boiled and maintained in this state of boiling under said reflux condenser for about 1 hour, after which considerable solid matter had settled at the bottom of the flask. The liquid portion was poured off and the remaining mass was neutralized with dilute sulfuric acid. After neutralization, sufficient hydrochloric acid was added to bring the pH value of the mass to around 0.5. It was then heated to around 260° F. to remove the water and polymerize to the desired viscosity. Immediately after reaching said temperature, the mass was rapidly cooled to room temperature. The resultant product is an intermediate or fusible thermosetting resin soluble in acetone, insoluble in water, cures to an infusible state upon maintaining 100 grams thereof for 12 to 16 hours at 100° C. either on the acid or alkaline side, reacts with paraformaldehyde and hexamethylene tetramine and has a specific gravity greater than 1.10.

Example 16

| | | |
|---|---|---|
| Furfuraldehyde | grams | 96 |
| Methyl ethyl ketone | do | 72 |
| 2-N sodium hydroxide | cc | 12½ | were mixed together and placed under a reflux condenser and heated together whereby the mixture is boiled and maintained in this state of boiling under said reflux condenser for 1 hour after which time the mixture was neutralized with dilute hydrochloric acid. After neutralization, further hydrochloric acid was added to bring the pH to 0.5 and the mass was then heated at 220° F. with stirring to remove the water and polymerize to a heavy, thick thermosetting resin. Then it was rapidly cooled to room temperature. This resultant product was an intermediate or fusible thermosetting resin soluble in acetone, insoluble in water, cures to an infusible state upon maintaining 100 grams thereof for 12 to 16 hours at 100° C. either on the acid or alkaline side, reacts with paraformaldehyde and hexamethylene tetramine and has a specific gravity greater than 1.10.

Example 17

Following the procedure of any one of the Examples 1 to 17 inclusive and after the desired viscosity has been reached by heating under acidic conditions, a quantity of sodium hydroxide in water solution may then be added thereto to increase the pH to a value of 3-14 and if desired to a value of 8-14. This will tend to increase the viscosity of the mass and therefore the mass by the application of heat should be further dehydrated as rapidly as possible and cooled very rapidly in order to stop the whole mixture from going over to the infusible stage. Under proper conditions of handling, this product which may now be on the alkaline side is an intermediate or fusible thermosetting resin soluble in acetone, insoluble in water, cures to an infusible state upon maintaining 100 grams thereof for 12 to 16 hours at 100° C. either on the acid or alkaline side, reacts with paraformaldehyde and hexamethylene tetramine and has a specific gravity greater than 1.10.

Example 18

An example of another method which may be employed to convert said resin made under alkaline conditions is to pass chlorine through the resultant mass after reaction of furfuraldehyde and a ketone under alkaline conditions. Free chlorine is passed through said mass whereupon the temperature of the mass increases and the mass becomes polymerized under the now acidic condition having a pH of less than 3 and between 0.5-1.5 which now exists. After the desired degree of polymerization or viscosity has been reached, the addition of chlorine is stopped and the mass is cooled rapidly to room temperature.

If desired, free chlorine may be added to said mass after the reaction of furfuraldehyde and a ketone under alkaline conditions to such an extent that the furfuraldehyde-ketone resin reaction product may be chlorinated to any desired extent and may be as high as 100% of chlorine based on the weight of said resin. In chlorinating, I prefer to dissolve the resin in a solvent which is inert to free chlorine and to pass the free chlorine in said solution while maintaining the solution below about 100° F. during the addition. After chlorination, the solvent may be evaporated therefrom or the product may be used in the solution. However, if only 1 to 10% chlorine based on the weight of the resin is desired in the final chlorinated product, the same need not be dissolved in a solvent, but the chlorine may be added directly thereto and preferably while cooled and maintained at a temperature of about 100° F. The chlorinated products all are thermosetting fusible or intermediate resins which may be converted to the infusible state by heating and may be substituted herein for the novel resins of Examples 1 to 18.

In order to provide a fairly fast curing novel fusible thermosetting resin according to Examples 1 to 18 inclusive, it is preferable that the starting materials made under alkaline conditions be heated under acidic conditions whereby the pH is less than 3 and preferably 0.5-1.5 for such a length of time and at between 180°-260° F. that the same is dehydrated and polymerized to such a state that it is roughly of the consistency of molasses, although any of my thermosetting fusible resins having a lower viscosity as low as 300 centipoises at 25° C. are within the scope of this invention.

These novel intermediate fusible thermosetting resins, examples of which are set forth in Examples 1 to 19 inclusive, find a wide variety of applications, among which are the following: (a) employing the same as binders in a brake lining, after which it is cured to the infusible state, (b) heating the same to render them infusible, comminuting the infusible product and incorporating the comminuted product in a brake lining, (c) admixing the same with asbestos, rubber particles and other fillers and then cured to provide products useful as a brake lining, all of these uses (a), (b) and (c) referring to brake linings being equally applicable to other friction elements, such as clutch facings and the like, (d) reacting the same with formaldehyde, paraformaldehyde or hexamethylene tetramine to produce condensation reaction products thereof, (e) heating from 1 to 6 hours at between about 85° C. to 120° C. a combination of the same and one or more other intermediate or fusible resins such as lignin resins, phenol-formaldehyde resins, cashew nut shell liquid resins, either of the formaldehyde reaction type or polymerized type, cardanol resins either of the formaldehyde reaction type or the polymerized type, shellac, polyhydroxy dibasic reaction products such as phthalic anhydride glycerine and the like, (f) the same are suitable for making water emulsions finding use as coating and impregnating material, (g) the same are useful as coating materials, (h) the same are useful as electrical insulating material and may be applied to a base to coat or impregnate the same, which combination is heated to convert the applied resin to the infusible state and this coated base is an electrical insulating material, (i) the same may be spread as a thin coating as a substitute for shellac and may if desired be heated to convert the same to the infusible state, (j) the same may be employed as a constituent of chemically resistant paints, (k) the same may be employed in the lamination of different layers, (l) the same may be used as an adhesive.

Some of the particular uses to which the novel products may be put and the manner of employing them to provide novel products are hereinafter set forth in the following examples.

Example 19.—Lamination

A paper, cloth or other unit to be laminated with some other unit is coated with a solution of any one of the novel intermediate or fusible resins disclosed in Examples 1 to 19 inclusive. The solvent may be ethyl acetate, acetone or other commerical solvent. If a 2-mill saturating kraft paper is employed, the solution is applied to one side thereof and this saturated coated paper is then baked at about 250° F. for several minutes or until the product is dry at room temperature but is still in the intermediate or fusible state. This can then be laminated in the usual manner under pressure of 2000 to 3000 lbs. per square inch at about 280° F. The time of curing depends on the thickness of the layers being laminated, and generally ranges from about 15 minutes to about 5 hours. This same general procedure may be followed in all cases of laminating.

*Example 20.—Molding powder*.

100 parts of any one of the intermediate or fusible thermosetting resins of Examples 1 to 19 inclusive, 100 parts of wood flour containing lignin and/or lignocellulose, 5 parts of zinc oxide, 5 parts iron oxide and 7½ parts of hexamethylene tetramine are milled together on hot differential rolls of a rubber mill which rolls are maintained at a temperature of about 200° F. At the beginning the mass will adhere to both rolls, but as the milling is continued, the reaction proceeds until all the mass leaves the front or slower roll which is in a highly polished condition and adheres to the back or faster roll. Milling is continued until a small sample removed from the mill is brittle at room temperature and at this stage, the mass is removed from the mill, cooled to room temperature. This product is then ground to a powder which may be of the desired fineness. This powder may then be molded at pressures of about 2000 lbs. per square inch and while under that pressure may be cured at about 280°–380° F., the time of curing depending upon the thickness of the article and for the general run of articles may be between one and one-half to 20 minutes. In the above example, the wood flour may be eliminated or the aldehyde may be eliminated, but a larger quantity of either is employed. In addition, paraformaldehyde or formaldehyde may be substituted for the hexamethylene tetramine in any case. If formaldehyde or paraformaldehyde is employed in place of the hexamethylene tetramine, an acid and preferably a weak organic acid or a base which may be either a strong or weak base should be employed as a catalytic condensing agent. The novel intermediate or fusible thermosetting resin employed in this example may be either a liquid or of any desired viscosity, it may be a gel or it may be a brittle solid.

*Example 21.—Emulsion*

Although any of the resins of the desired consistency or viscosity may be employed, I shall for the purpose of this illustration, employ any one of the novel intermediate and fusible resins made according to any one of Examples 1 to 19 inclusive and having a viscosity about that of molasses.

| | Parts |
|---|---|
| Novel resin | 100 |
| Bentonite | 35 |
| Water | 200–400 |

These ingredients are placed in a suitable mixing device, such as a paddle mixer, Z-blade mixer or the like and therein subjected to agitation and mixing action to provide a smooth, homogeneous emulsion. This emulsion finds application as a coating for paper, cloth, metal, etc., it may also be used for mixing with fillers, such as asbestos, wood flour and the like. In any of these uses, it may be dehydrated under reduced pressure or by exposure to the air in thin film and then formed and cured in an open oven or under heat and pressure.

Having thus described my invention, what I claim and desire to protect by Letters Patent is:

1. The method for producing a thermosetting resin comprising under pH conditions in the range of 0.5–1.5 homopolymerizing by externally heating at a temperature of 180° F.–260° F. until said resin is produced an organic condensation reaction mass produced by reacting under alkaline conditions furfuraldehyde and a ketone having at least two hydrogen atoms on an alpha carbon, said mass including a resin measuring about 5–50% by weight of said mass.

2. The method for producing a thermosetting resin comprising externally heat homopolymerizing at 180° F.–260° F. until said resin is produced a mixture whose pH is in the range of 0.5–1.5 and comprising an aqueous solution of an acid agent and an organic condensation reaction mass produced by reacting under alkaline conditions furfuraldehyde and a ketone having at least two hydrogen atoms on an alpha carbon, said mass including a resin measuring about 5–50% by weight of said mass.

3. The method for producing a thermosetting resin comprising under pH conditions in the range of 0.5–1.5 homopolymerizing by externally heating at a temperature of 180° F.–260° F. until said resin is produced an organic condensation reaction mass produced by reacting under alkaline conditions furfuraldehyde and acetone, said mass including a resin measuring about 5–50% by weight of said mass.

4. The method for producing a thermosetting resin comprising under pH conditons in the range of 0.5–1.5 homopolymerizing by externally heating at a temperature of 180° F.–260° F. until said resin is produced an organic condensation reaction mass produced by reacting under alkaline conditions furfuraldehyde and diacetone alcohol, said mass including a resin measuring about 5–50% by weight of said mass.

5. The method for producing a thermosetting resin comprising under pH conditions in the range of 0.5–1.5 homopolymerizing by externally heating at a temperature of 180° F.–260° F. until said resin is produced an organic condensation reaction mass produced by reacting under alkaline conditions furfuraldehyde and methyl ethyl ketone, said mass including a resin measuring about 5–50% by weight of said mass.

6. A stable thermosetting resin produced according to claim 1.

7. A stable thermosetting resin produced according to claim 3.

8. A stable thermosetting resin produced according to claim 4.

9. A stable thermosetting resin produced according to claim 5.

MORTIMER T. HARVEY.

No references cited